United States Patent
Lo (10) Patent No.: US 9,601,825 B1
(45) Date of Patent: Mar. 21, 2017

(54) MOBILE DEVICE

(71) Applicant: Quanta Computer Inc., Taoyuan (TW)

(72) Inventor: Wen-Yuan Lo, Taoyuan (TW)

(73) Assignee: QUANTA COMPUTER INC., Guishan Dist., Taoyuan (TW)

( * ) Notice: Subject to any disclaimer, the term of this patent is extended or adjusted under 35 U.S.C. 154(b) by 0 days.

(21) Appl. No.: 15/008,970

(22) Filed: Jan. 28, 2016

(30) Foreign Application Priority Data

Dec. 8, 2015 (TW) .............................. 104141044 A (51) Int. Cl.
*H04B 1/00* (2006.01)
*H01Q 1/52* (2006.01)
*H04B 1/3827* (2015.01)
*H01Q 1/22* (2006.01)

(52) U.S. Cl.
CPC .......... *H01Q 1/521* (2013.01); *H01Q 1/2266* (2013.01); *H04B 1/3827* (2013.01)

(58) Field of Classification Search
CPC ........................ H04B 7/0404; H04B 7/0825
USPC .................................. 455/575.7, 121, 193.1
See application file for complete search history.

(56) References Cited

U.S. PATENT DOCUMENTS

| 8,860,623 | B2 | 10/2014 | Lo et al. | |
|---|---|---|---|---|
| 2009/0174611 | A1* | 7/2009 | Schlub | H01Q 1/243 343/702 |
| 2013/0135154 | A1* | 5/2013 | Sumi | H01Q 1/243 343/700 MS |
| 2014/0085158 | A1* | 3/2014 | Wong | H01Q 1/48 343/841 |
| 2014/0139391 | A1* | 5/2014 | Lo | H01Q 1/521 343/841 |
| 2015/0244411 | A1* | 8/2015 | Harper | H04B 1/401 455/77 |
| 2016/0093949 | A1* | 3/2016 | Chang | H01Q 1/526 343/841 |
| 2016/0111777 | A1* | 4/2016 | Yang | H01Q 1/50 343/841 |

FOREIGN PATENT DOCUMENTS

| TW | 201411937 | 3/2014 |
|---|---|---|
| TW | 201421802 | 6/2014 |

OTHER PUBLICATIONS

Chinese language office action dated Sep. 2, 2016, issued in application No. TW 104141044.

* cited by examiner

*Primary Examiner* — Wen Huang
(74) *Attorney, Agent, or Firm* — McClure, Qualey & Rodack, LLP (57) ABSTRACT

A mobile device includes a ground element, a first antenna, a second antenna, and a filter. The filter is disposed between the first antenna and the second antenna. The filter includes a main branch and a tuning branch. The tuning branch is coupled through the main branch to the ground element. The first antenna and the second antenna cover the same operation frequency band. The filter is configured to enhance the isolation between the first antenna and the second antenna in the operation frequency band.

6 Claims, 7 Drawing Sheets

MOBILE DEVICE

CROSS REFERENCE TO RELATED APPLICATIONS

This Application claims priority of Taiwan Patent Application No. 104141044 filed on Dec. 8, 2015, the entirety of which is incorporated by reference herein.

BACKGROUND OF THE INVENTION

Field of the Invention

The disclosure generally relates to a mobile device, and more specifically, to a mobile device with a high isolation antenna system.

Description of the Related Art

With advancements in mobile communication technology, mobile devices such as portable computers, mobile phones, multimedia players, and other hybrid functional portable electronic devices have become more common. To satisfy user demand, mobile devices can usually perform wireless communication functions. Some devices cover a large wireless communication area; these include mobile phones using 2G, 3G, and LTE (Long Term Evolution) systems and using frequency bands of 700 MHz, 850 MHz, 900 MHz, 1800 MHz, 1900 MHz, 2100 MHz, 2300 MHz, and 2500 MHz. Some devices cover a small wireless communication area; these include mobile phones using Wi-Fi and Bluetooth systems and using frequency bands of 2.4 GHz, 5.2 GHz, and 5.8 GHz.

An antenna system is indispensable in a mobile device supporting wireless communication. However, since the interior space of a mobile device is very limited, multiple antennas are usually disposed close to each other, and such a design causes serious interference between antennas. As a result, there is a need to design a new antenna system for solving the problem of bad isolation in a conventional antenna system.

BRIEF SUMMARY OF THE INVENTION

In a preferred embodiment, the invention is directed to a mobile device including a ground element, a first antenna, a second antenna, and a filter. The filter is disposed between the first antenna and the second antenna. The filter includes a main branch and a tuning branch. The tuning branch is coupled through the main branch to the ground element.

In some embodiments, the first antenna and the second antenna cover the same operation frequency band. The filter is configured to enhance isolation between the first antenna and the second antenna in the operation frequency band.

In some embodiments, the total length of the main branch and the tuning branch is equal to 0.25 wavelength of the operation frequency band.

In some embodiments, the main branch substantially has an L-shape.

In some embodiments, the tuning branch substantially has a rectangular shape.

In some embodiments, the main branch defines a notch. A connection end of the tuning branch is coupled to the main branch, and an open end of the tuning branch extends into the notch.

In some embodiments, the filter further includes a coupling branch. A connection end of the coupling branch is coupled to the tuning branch, and an open end of the coupling branch extends toward the ground element.

In some embodiments, a coupling gap between the open end of the coupling branch and the ground element is shorter than 1 mm.

In some embodiments, the mobile device further includes a first flexible printed circuit board and a second flexible printed circuit board. The first antenna is disposed on the first flexible printed circuit board. The second antenna and the filter are disposed on the second flexible printed circuit board.

In some embodiments, the mobile device is a notebook computer. The first flexible printed circuit board and the second flexible printed circuit board are adjacent to the display device of the notebook computer, and are disposed between two hinge elements of the notebook computer.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to illustrate the purposes, features and advantages of the invention, the embodiments and figures of the invention are shown in detail as follows.

Figure 1:
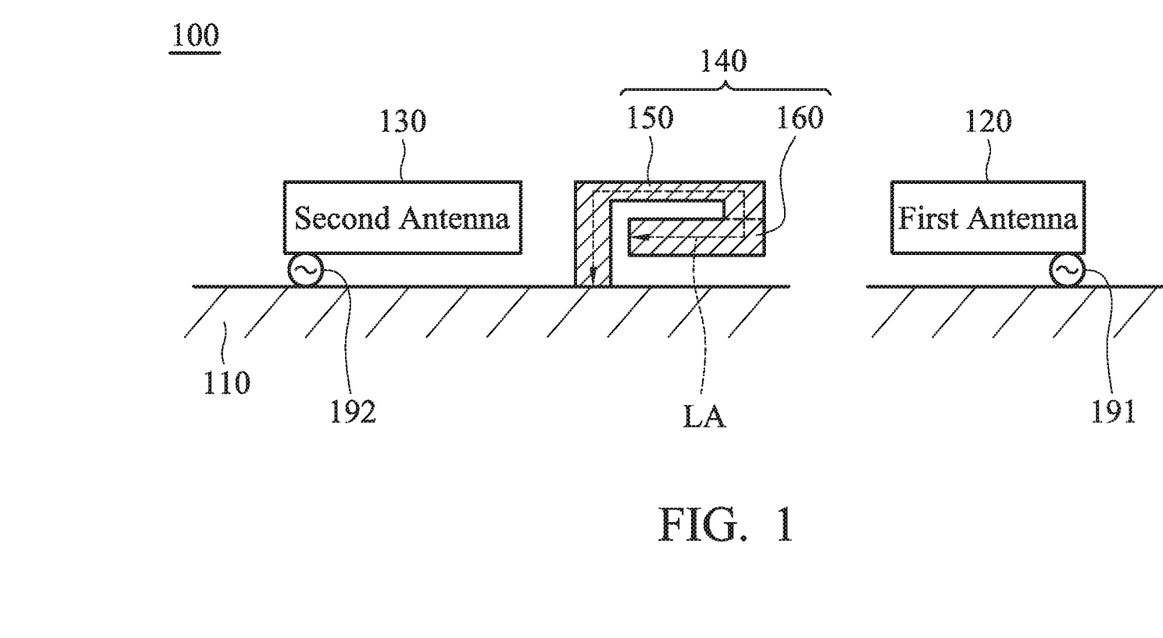
FIG. 1 is a diagram of a mobile device according to an embodiment of the invention.

FIG. 1 is a diagram of a mobile device 100 according to an embodiment of the invention. The mobile device 100 may be a smartphone, a tablet computer, or a notebook computer. As shown in FIG. 1, the mobile device 100 includes a ground element 110, a first antenna 120, a second antenna 130, and a filter 140. The ground element 110, the first antenna 120, the second antenna 130, and the filter 140 may be made of conductive materials, such as copper, silver, aluminum, iron, or their alloys. The ground element 110 may be a ground metal plane, such as a ground copper, which may be coupled to a metal back cover of the mobile device 100. The types and shapes of the first antenna 120 and the second antenna 130 are not limited in the invention. For example, the first antenna 120 or the second antenna 130 may be a monopole antenna, a dipole antenna, a loop antenna, a patch antenna, a helical antenna, a PIFA (Planar Inverted F Antenna), or a chip antenna. It should be understood that the mobile device 100 may further include other components, such as a processor, a display device, a keyboard, a battery, and a housing, although they are not displayed in FIG. 1.

The first antenna 120 and the second antenna 130 form an antenna system of the mobile device 100. For example, the first antenna 120 may be used as a main antenna, and the second antenna 130 may be used as an auxiliary antenna, so as to increase the antenna diversity gain of the mobile device 100. The first antenna 120 may be excited by a first signal source 191, and the second antenna 130 may be excited by a second signal source 192. The first antenna 120 and the second antenna 130 may cover the same operation frequency band. For example, the aforementioned operation frequency band may be from 2400 MHz to 2500 MHz, and/or from 5150 MHz to 5850 MHz, thereby covering the WLAN (Wireless Local Area Network) 2.4/5 GHz frequency bands.

The filter 140 is disposed between the first antenna 120 and the second antenna 130. The filter 140 includes a main branch 150 and a tuning branch 160. The tuning branch 160 is coupled through the main branch 150 to the ground element 110. The filter 140 is configured to enhance the isolation between the first antenna 120 and the second antenna 130 in the aforementioned operation frequency band. In the embodiment of FIG. 1, the main branch 150 substantially has an L-shape, and the tuning branch 160 substantially has a rectangular shape. The line width of the tuning branch 160 is greater than the line width of the main branch 150. It should be noted that the invention is not limited to the above description. In alternative embodiments, the main branch 150 or the tuning branch 160 has a different shape, such as a straight-line shape, a J-shape, an F-shape, an S-shape, or an N-shape. The total length LA of the main branch 150 and the tuning branch 160 may preferably be equal to 0.25 wavelength of the aforementioned operation frequency band. With such a design, the filter 140 also resonates in the aforementioned operation frequency band, and its main branch 150 and the tuning branch 160 attract the surface currents on the ground element 110, so as to prevent the exciting current and radiation patterns of the first antenna 120 and the second antenna 130 from interfering with each other. The incorporation of the filter 140 helps to reduce the spacing between the first antenna 120 and the second antenna 130, thereby further minimizing the total area of the antenna system. Accordingly, the invention is suitable for application in a variety of small-size mobile devices.

Figure 2:
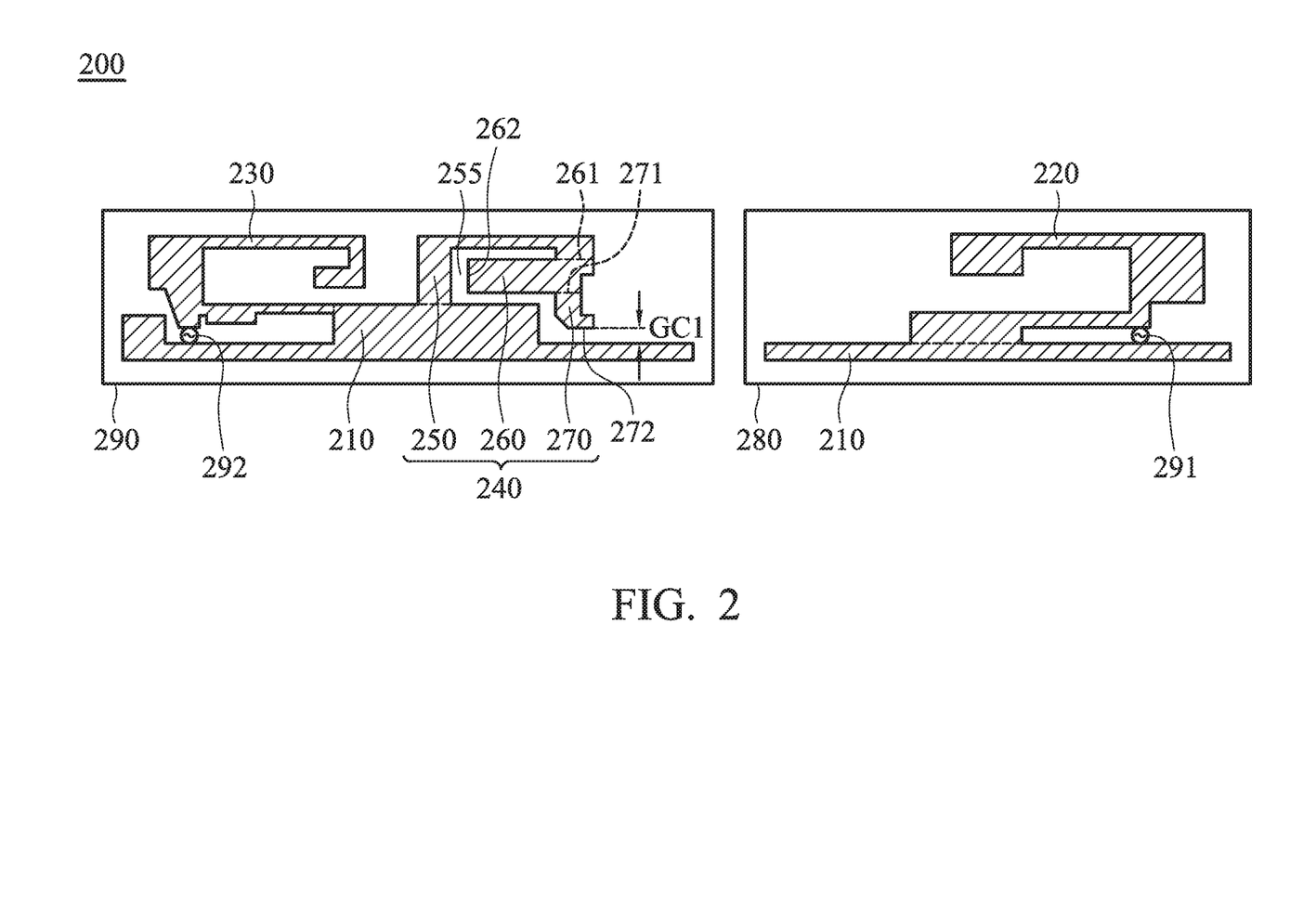
FIG. 2 is a diagram of a mobile device according to an embodiment of the invention.

FIG. 2 is a diagram of a mobile device 200 according to an embodiment of the invention. FIG. 2 is similar to FIG. 1. In the embodiment of FIG. 2, the mobile device 200 includes a ground element 210, a first antenna 220, a second antenna 230, a filter 240, a first flexible printed circuit board 280, and a second flexible printed circuit board 290. The ground element 210, the first antenna 220, the second antenna 230, and the filter 240 may be made of conductive materials. The ground element 210 may be a ground copper, which includes two portions disposed on the first flexible printed circuit board 280 and the second flexible printed circuit board 290, respectively. The first antenna 220 and the second antenna 230 form an antenna system of the mobile device 200. For example, the first antenna 220 may be used as a main antenna, and the second antenna 230 may be used as an auxiliary antenna. The first antenna 220 and the second antenna 230 can cover the same operation frequency band. The first antenna 220 and the second antenna 230 may be PIFAs (Planar Inverted F Antennas), and may be excited by a first signal source 291 and the second signal source 292, respectively. The first flexible printed circuit board 280 is completely separate from the second flexible printed circuit board 290. The first antenna 220 is disposed on the first flexible printed circuit board 280. The second antenna 230 and the filter 240 are disposed on the second flexible printed circuit board 290.

The filter 240 is disposed between the first antenna 220 and the second antenna 230. The filter 240 includes a main branch 250, a tuning branch 260, and a coupling branch 270. The coupling branch 270 is coupled through the tuning branch 260 and the main branch 250 to the ground element 210. The filter 240 is configured to enhance the isolation between the first antenna 220 and the second antenna 230 in the aforementioned operation frequency band. The main branch 250 may substantially have an L-shape. The tuning branch 260 may substantially have a rectangular shape. The coupling branch 270 may have a corner shape. The line width of the tuning branch 260 may be greater than the line width of the main branch 250 and the line width of the coupling branch 270. Specifically, the main branch 250 defines a notch 255, which substantially has a rectangular shape. A connection end 261 of the tuning branch 260 is coupled to the main branch 250, and an open end 262 of the tuning branch 260 extends into the notch 255. A connection end 271 of the coupling branch 270 is coupled to the tuning branch 260, and an open end 272 of the coupling branch 270 extends toward the ground element 210. A coupling gap GC1 between the open end 272 of the coupling branch 270 and the ground element 210 is shorter than 1 mm. The coupling branch 270 is an optional element, and the coupling effect between the coupling branch 270 and the ground element 210 is arranged for optimizing the impedance matching of the filter 240. A total length of the main branch 250, the tuning branch 260, and the coupling branch 270 is preferably equal to 0.25 wavelength of the aforementioned operation frequency band. With such a design, the filter 240 also resonates in the aforementioned operation frequency band, and its main branch 250, the tuning branch 260, and the coupling branch 270 attract the surface currents on the ground element 210, so as to prevent the exciting currents and radiation patterns of the first antenna 220 and the second antenna 230 from interfering with each other.

Figure 3:
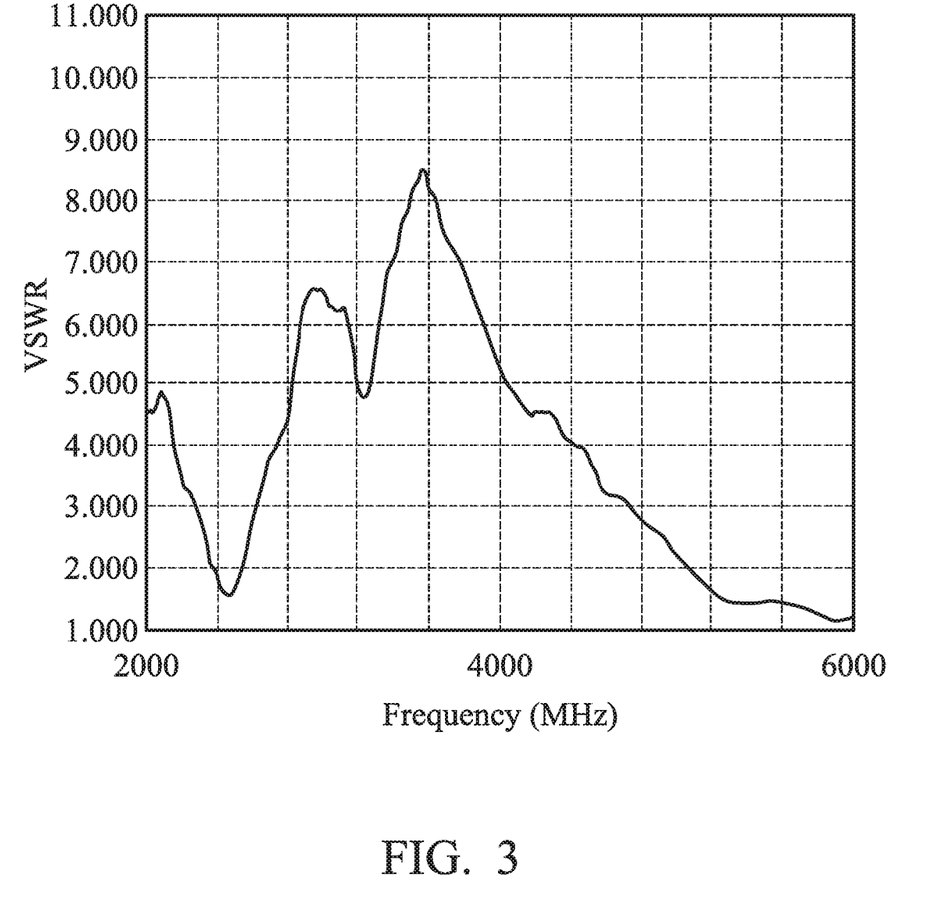
FIG. 3 is a diagram of a VSWR (Voltage Standing Wave Ratio) of a first antenna of a mobile device according to an embodiment of the invention.

FIG. 3 is a diagram of a VSWR (Voltage Standing Wave Ratio) of the first antenna 220 of the mobile device 200 according to an embodiment of the invention. The horizontal axis represents the operation frequency (MHz), and the vertical axis represents the VSWR. As shown in FIG. 3, when the first antenna 220 is excited by the first signal source 291, it can cover at least the operation frequency band from 2400 MHz to 2500 MHz and further from 5150 MHz to 5850 MHz.

Figure 4:
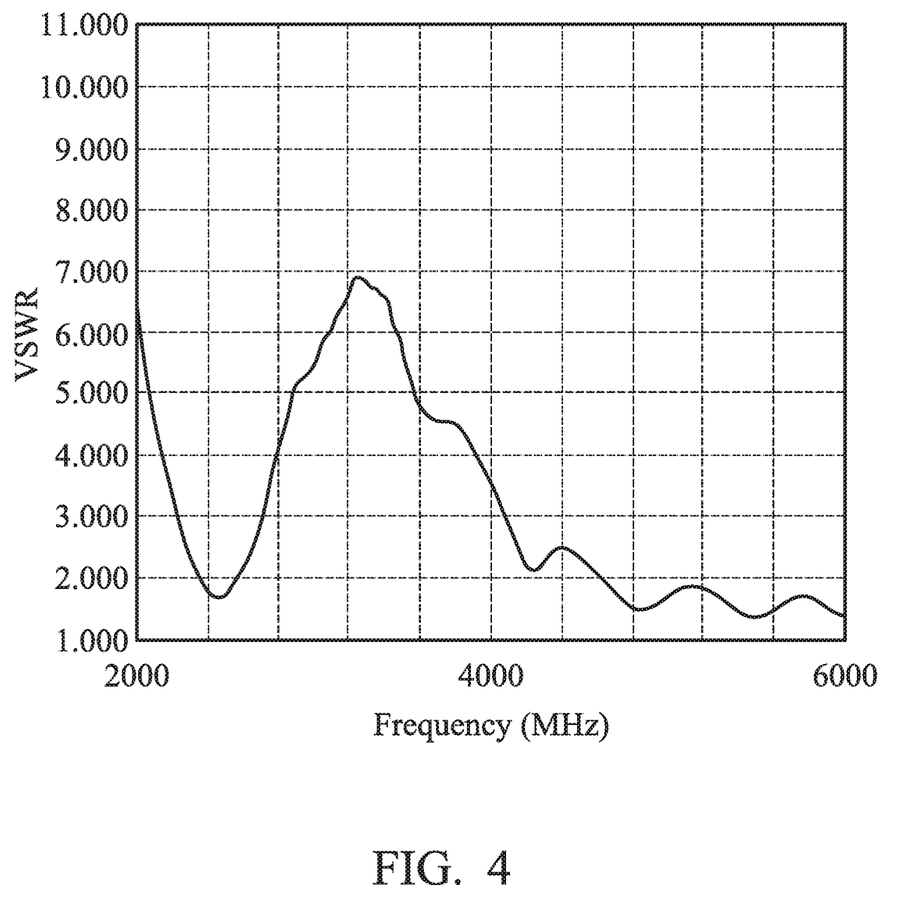
FIG. 4 is a diagram of a VSWR of a second antenna of a mobile device according to an embodiment of the invention.

FIG. 4 is a diagram of a VSWR of the second antenna 230 of the mobile device 200 according to an embodiment of the invention. The horizontal axis represents the operation frequency (MHz), and the vertical axis represents the VSWR. As shown in FIG. 4, when the second antenna 230 is excited by the second signal source 292, it can cover at least the operation frequency band from 2400 MHz to 2500 MHz and further from 5150 MHz to 5850 MHz.

Figure 5:
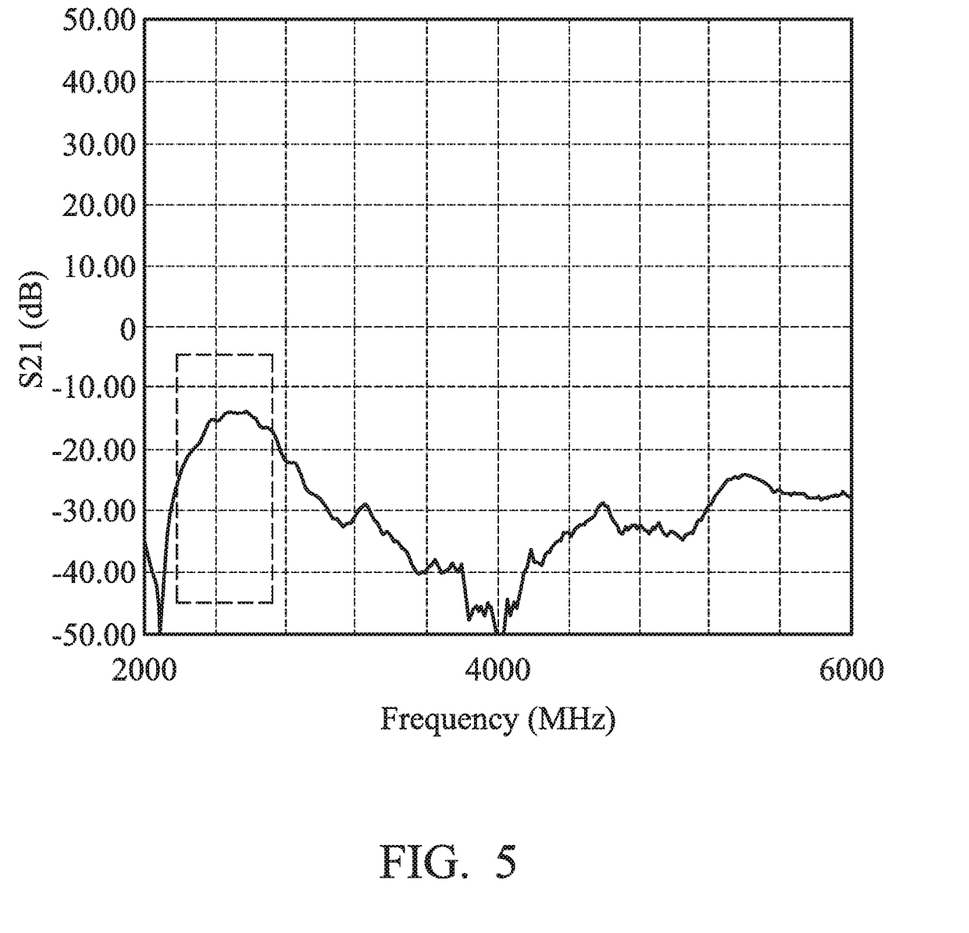
FIG. 5 is a diagram of S parameters of a first antenna and a second antenna when a filter is removed from a mobile device.

FIG. 5 is a diagram of S parameters of the first antenna 220 and the second antenna 230 when the filter 240 is removed from the mobile device 200. The horizontal axis represents the operation frequency (MHz), and the vertical axis represents the S21 (or S12) parameter (dB). The first antenna 220 is set as a first port (Port 1), and the second antenna 230 is set as a second port (Port 2). As shown in FIG. 5, without the filter 240 in the mobile device 200, the S21 parameter between the first antenna 220 and the second antenna 230 is about −15 dB in the operation frequency band from 2400 MHz to 2500 MHz, meaning that the first antenna 220 and the second antenna 230 tend to interfere with each other.

Figure 6:
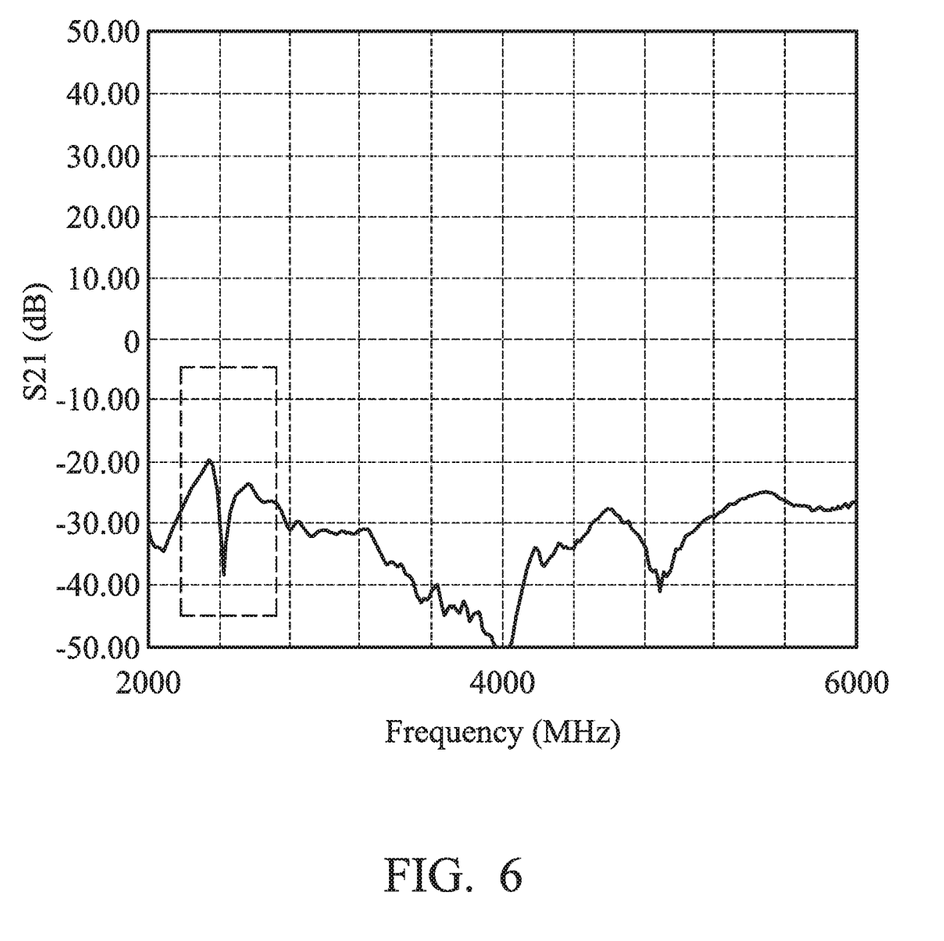
FIG. 6 is a diagram of S parameters of a first antenna and a second antenna when a mobile device includes a filter, according to an embodiment of the invention.

FIG. 6 is a diagram of S parameters of the first antenna 220 and the second antenna 230 when the mobile device 200 includes the filter 240, according to an embodiment of the invention. The horizontal axis represents the operation frequency (MHz), and the vertical axis represents the S21 (or S12) parameter (dB). The first antenna 220 is set as a first port (Port 1), and the second antenna 230 is set as a second port (Port 2). As shown in FIG. 6, with the filter 240 in the mobile device 200, the S21 parameter between the first antenna 220 and the second antenna 230 is decreased to about −20 dB (the best is −30 dB) in the operation frequency band from 2400 MHz to 2500 MHz, meaning that the filter 240 has almost band-rejection characteristics and therefore effectively improves the isolation between the first antenna 220 and the second antenna 230. Accordingly, even if the first antenna 220 and the second antenna 230 are close to each other, the interference therebetween can be overcome by adding a filter 240, improving the communication quality of the antenna system.

Figure 7:
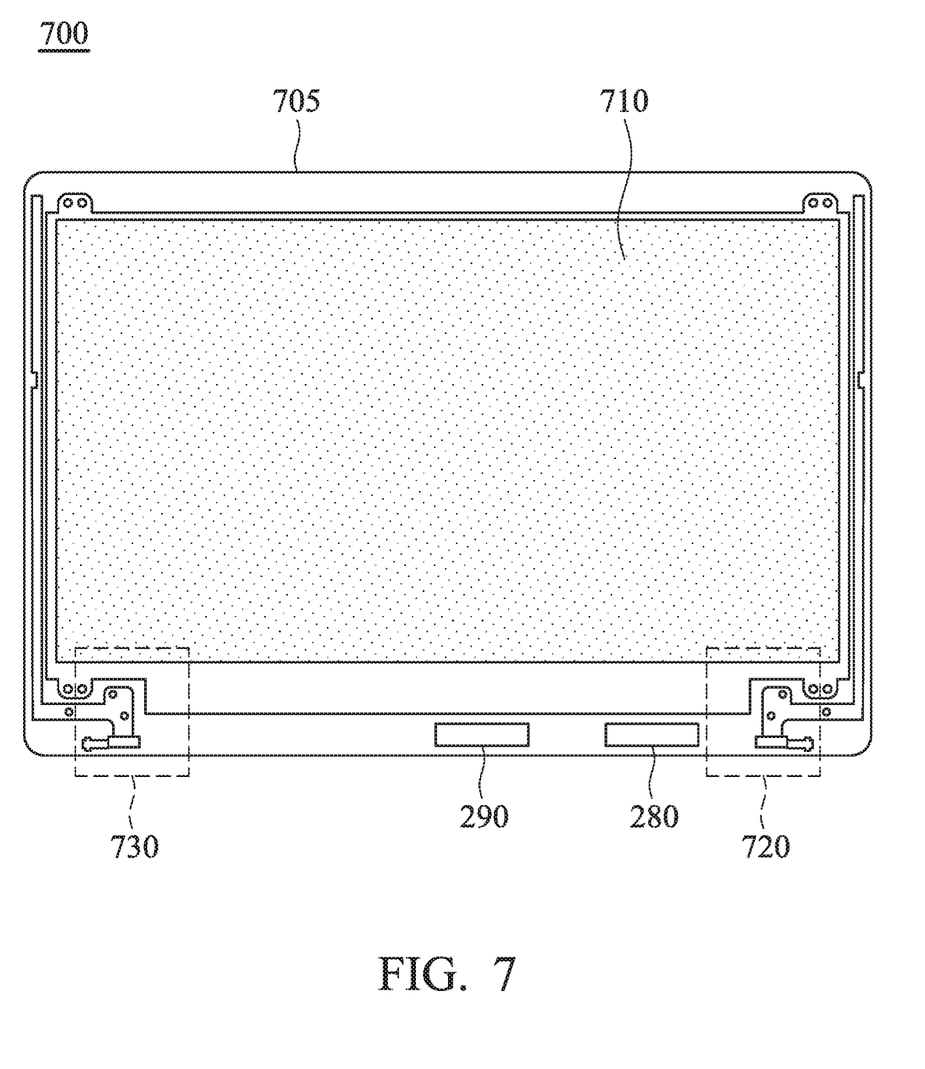
FIG. 7 is a diagram of a mobile device according to an embodiment of the invention.

FIG. 7 is a diagram of a mobile device 700 according to an embodiment of the invention. In the embodiment of FIG. 7, the mobile device 700 is a notebook computer, which includes an upper cover 705, a lower cover, and two hinge elements 720 and 730. The hinge elements 720 and 730 are coupled between the upper cover 705 and the lower cover, such that the mobile device 700 can operate in an open mode or a closed mode. A display device 710 is embedded in the upper cover 705. The first flexible printed circuit board 280 and the second flexible printed circuit board 290 of FIG. 2 can be applied to the mobile device 700 of FIG. 7. As mentioned above, the first flexible printed circuit board 280 supports the first antenna 220, and the second flexible printed circuit board 290 supports the second antenna 230 and the filter 240. The filter 240 is disposed between the first antenna 220 and the second antenna 230. Specifically, the first flexible printed circuit board 280 and the second flexible printed circuit board 290 are adjacent to the display device 710 of the notebook computer, and are disposed between the two hinge elements 720 and 730 of the notebook computer. If the filter 240 is included, the spacing between the first flexible printed circuit board 280 and the second flexible printed circuit board 290 can be reduced, and therefore the antenna-related components can be easily designed in a narrow clearance region of the notebook computer. For example, the aforementioned antenna-related components may be disposed inside a narrow and long clearance region, which is surrounded by the display device 710, the hinge elements 720 and 730, and the edge of the upper cover 705. These antenna-related components can use a slit between the hinge elements 720 and 730 to transmit and receive electromagnetic signals. The invention has the advantages of both minimizing the total area of the antenna system, and increasing the isolation of the antenna system.

As to the element sizes, the first flexible printed circuit board 280 may have a length of about 35 mm, a width of about 9 mm, and a thickness of about 0.2 mm. The second flexible printed circuit board 290 may have a length of about 43 mm, a width of about 9 mm, and a thickness of about 0.2 mm. The spacing between the first flexible printed circuit board 280 and the second flexible printed circuit board 290 may be about 22 mm. The proposed antenna system of the invention occupies a smaller clearance region than a conventional design does.

Note that the above element sizes, element shapes, and frequency ranges are not limitations of the invention. An antenna engineer can adjust these settings or values according to different requirements. It should be understood that the mobile device and antenna system of the invention are not limited to the configurations of FIGS. 1-7. The invention may merely include any one or more features of any one or more embodiments of FIGS. 1-7. In other words, not all of the features shown in the figures should be implemented in the mobile device and antenna system of the invention.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A mobile device, comprising:
  a ground element;
  a first antenna;
  a second antenna; and
  a filter, disposed between the first antenna and the second antenna, wherein the filter comprises a main branch and a tuning branch, and the tuning branch is coupled through the main branch to the ground element;
  wherein the main branch defines a notch, a connection end of the tuning branch is coupled to the main branch, and an open end of the tuning branch extends into the notch;
  wherein the filter further comprises a coupling branch, a connection end of the coupling branch is coupled to the tuning branch, and an open end of the coupling branch extends toward the ground element;
  wherein the main branch has an L-shape, the tuning branch has a rectangular shape, the coupling branch has a corner shape, and a line width of the tuning branch is greater than a line width of the main branch and a line width of the coupling branch.

2. The mobile device as claimed in claim 1, wherein the first antenna and the second antenna cover a same operation frequency band, and the filter is configured to enhance isolation between the first antenna and the second antenna in the operation frequency band.

3. The mobile device as claimed in claim 2, wherein a total length of the main branch and the tuning branch is equal to 0.25 wavelength of the operation frequency band.

4. The mobile device as claimed in claim 1, wherein a coupling gap between the open end of the coupling branch and the ground element is shorter than 1 mm.

5. The mobile device as claimed in claim 1, further comprising:
  a first flexible printed circuit board, wherein the first antenna is disposed on the first flexible printed circuit board; and
  a second flexible printed circuit board, wherein the second antenna and the filter are disposed on the second flexible printed circuit board.

6. The mobile device as claimed in claim 5, wherein the mobile device is a notebook computer, and the first flexible printed circuit board and the second flexible printed circuit board are adjacent to a display device of the notebook computer and are disposed between two hinge elements of the notebook computer.

\* \* \* \* \*